June 18, 1963 A. E. BREWSTER 3,094,626

PULSE CODING AND DECODING ARRANGEMENTS

Filed Dec. 7, 1959

Inventor
A. E. BREWSTER
By C. H. Suydam
AGENT

United States Patent Office 3,094,626 Patented June 18, 1963

3,094,626
PULSE CODING AND DECODING ARRANGEMENTS

Arthur Edward Brewster, London, England, assignor to International Standard Electric Corporation, New York, N.Y.

Filed Dec. 7, 1959, Ser. No. 857,829
Claims priority, application Great Britain Dec. 15, 1958
8 Claims. (Cl. 307—88)

The present invention relates to magnetic core trigger devices such, for example, as are used in coders and decoders for pulse code modulation systems of communication.

The invention is an improvement in or modification of, the invention described and claimed in United States application Serial No. 708,186, filed January 10, 1958, and assigned to the same assignee as is the present invention, which for convenience will be referred to below as the "parent specification."

In the case of multichannel code modulation systems, it has so far been proposed that when magnetic core coders are used, a separate coder should be used for each channel, the groups of code pulses so produced for the respective channels being afterwards interleaved; and similarly individual decoders are used for the respective channels. This is rather an extravagant arrangement, and it would be preferable first to obtain and interleave samples from the various channels, and then to code all the samples with a single coder common to all the channels, with analogous arrangements for decoding. The difficulty which has hitherto been found with this plan is that the cores in the coder and decoder have to be capable of being switched in an extremely short time, and with the magnetic materials available at present, this requires that the dimensions of the cores have to be reduced so much that it becomes impractical to provide them with the necessary windings.

In the case of the coder described in the parent specification, a separate core is provided for each signal amplitude level represented by the code. Each core is provided with a winding to which the signal wave is supplied, a bias winding, a trigger winding to which sampling pulses are supplied, and one or more output windings. The bias windings on the cores have a different number of turns for each level, and a bias current is sent through the bias windings in series so as to produce a bias field in each core in opposition to the field produced by the signal wave. Thus only one core, in which the signal field is nearly equal to the bias field, is not saturated and can be switched, and a corresponding output obtained. All the other cores are saturated in one direction or the other, and cannot be switched.

In this arrangement it is possible for each winding except the bias winding to have only one turn, but the bias windings corresponding to the highest levels may need, for example, 60 or more turns, according to the number of amplitude levels represented by the code. In order to accommodate the necessary windings, if the wire used is to be of large enough gauge to carry the currents, it may be necessary to appreciably increase the size of the cores. In addition to increasing the switching time, this also increases the hysteresis losses in the larger volume of the core, and thus represents a large drain of power on the signal wave source.

The object of the invention is to provide a magnetic trigger device or arrangement in which these difficulties are largely overcome.

The invention depends on the recognition that the saturation of the core material, which determines whether it is to be switched, or not, can be controlled by means other than windings which pass through a hole in the said material.

The invention will be described with reference to the accompanying drawings, in which.

Figure 3:
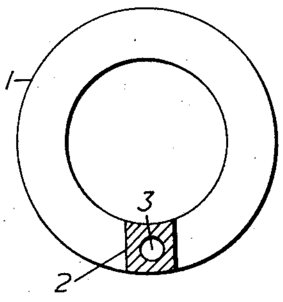
Figure 4:
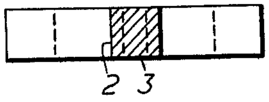
Figures 5, 6:
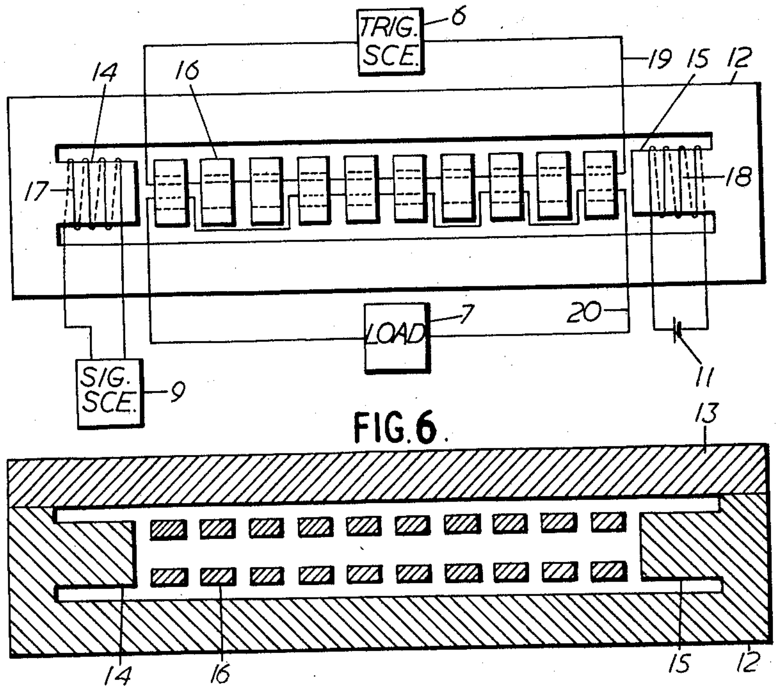

FIGS. 3 and 4 respectively show a plan view and front elevation of a modified form of the device;

FIG. 5 shows a plan view of an assembly of core devices according to the invention; and FIG. 6 shows a longitudinal section of the assembly shown in FIG. 5.

Figure 1:
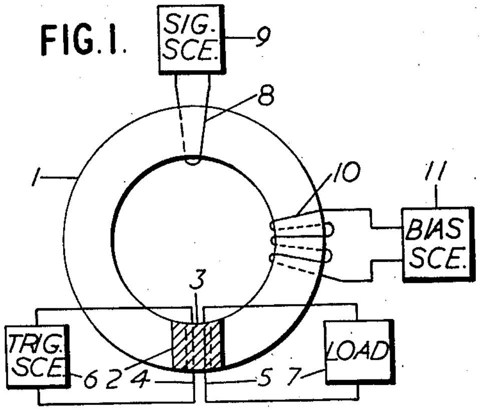
FIG. 1 shows a plan view of a magnetic core device according to the invention.
Figure 2:
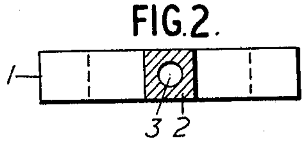
FIG. 2 shows a front elevation of the device.

The magnetic trigger device or arrangement according to the invention shown in FIGS. 1 and 2 comprises a toroid 1, the major portion of which is made of a magnetic material having low retentivity and low hysteresis loss, and which is preferably substantially unsaturable. This part of the core may, for example, be made of a suitable permalloy or ferrite material. A small substantially cubical portion 2 of the core, shown shaded, is of a different magnetic material, which has a high retentivity and is saturable, and may have a wide hysteresis loop. The portion 2 may comprise a ferrite material, and is provided with a radial hole 3 through which are threaded two wires 4 and 5 forming single-turn windings on the portion 2 of the core. Winding 4 is connected to a source 6 of trigger pulses, and winding 5 is connected to an output load 7. Windings 4 and 5 do not effectively link the major portion of the core. A winding 8 linking the major portion of the core 1 is connected to a source 9 of signal waves, while a second winding 10 also linking the major portion of the core 1 is connected to a direct current bias source 11. Windings 8 and 10 are shown as having one turn, and three turns, respectively, but it will be understood that either could have any suitable number of turns. It will be noted that windings 8 and 10 do not pass through the hole 3. The various windings are not shown in the front view of the core shown in FIG. 2 in order not to complicate the figure.

Assuming that the core 1 is used to define one of the amplitude levels of the coder described in the parent specification, then the signal and bias currents are respectively supplied to windings 8 and 10 in such manner as to produce opposing fluxes in the major portion of the core. When the two fluxes are unequal, a residual magnetizing flux will circulate in one direction or the other round the core and will saturate the portion 2 so that it cannot be switched by a trigger pulse from the source 6. However, if the amplitude of the signal wave supplied to winding 8 is such that the fluxes in the core due to the signal and bias currents substantially balance, then the total flux which circulates in the core 1 is insufficient to saturate the portion 2 and this portion therefore can be switched by a trigger pulse, so that a corresponding output pulse is delivered to the load circuit 7.

The signal level at which the portion 2 can be switched is determined by the number of turns of the bias winding 10.

The advantage of this arrangement is that the volume of material of the switchable portion 2 can be reduced to vary small limits. It is only necessary that the hole 3 should be large enough for the single-turn windings 4 and 5, though it must be pointed out that when this core device is used in a coder such as that described in the parent specification, there will be several additional output windings (not shown). The total number of output windings will not exceed the number of digits of the code. It will be noted that the major portion of the core may be made as large as may be required to accommodate the signal and bias windings without affecting the rate of switching of the saturable material of the portion 2.

It will also be noted that since the volume of the portion 2 is so small, the load on the source 9 due to hysteresis is also very small provided that the material of the major portion of the core 1 has small hysteresis loss. Another advantage of this arrangement is that since the flux due to the signal current does not circulate round the hole 3 but passes in parallel paths above and below the hole, there is no tendency for the changing signal current to switch the portion 2 in the absence of triggering pulses. This is liable to happen in the arrangement of the parent specification if the signal current varies very rapidly.

It may be mentioned that by reducing the amount of saturable material to be switched, not only is the switching time reduced, but also the amplitude of the triggering pulses necessary to switch the material completely.

As shown in FIGS. 3 and 4, it is possible for the hole 3 in the portion 2 to be parallel to the axis of the toroid, instead of radial. The windings are not shown in FIGS. 3 and 4, but it will be understood that they may be provided and connected as shown in FIGS. 1 and 2.

The effective air gaps between the two portions of the core device illustrated in FIGS. 1 and 2, or 3 and 4, should be reduced to a minimum. The device could, for example, be manufactured as a one-piece unit by two successive molding operations using the two different magnetic materials which compose the device. It is, of course, not essential that the portion 2 should be of substantially cubical shape, as shown, but the gap in the major portion of the core may be of any suitable shape filled up by the high retentivity material.

It will be understood that the core need not be made by molding, and the two portions of the magnetic circuit need not be of moldable material. The core may be constructed in any convenient manner suitable to the nature of the magnetic materials used.

A different form of the invention is illustrated in FIGS. 5 and 6 which shows an assembly for defining the quantizing levels of a coder which operates generally on similar lines to that of the parent specification. A hollow rectangular box or trough 12 of low retentivity magnetic material is closed with a flat, close fitting, lid 13 as shown in FIG. 6. FIG. 5 shows the view looking into the trough with the lid removed. At the ends of the trough 12 are formed two short cylindrical or square pole-pieces 14, 15 of low retentivity material. Between these pole-pieces a plurality of small toroidal cores 16 are arranged in a straight line. These small cores are of high retentivity material.

In FIGS. 5 and 6 only ten cores are shown, but it will be understood that there may be any number, according to the number of amplitude levels represented by the code. Windings 17 and 18 are respectively wound on the pole-pieces 14 and 15, and may have the same, or a different number of turns. Winding 17 is connected to a source 9 of signal waves, and winding 18 is connected to a bias source 11, shown as a battery. Through all of the cores 15 is threaded a wire 19 connected to a trigger source 6, and forming a single turn trigger winding on each core. Through certain of the cores 16 is threaded a second wire 20 connected to an output load 7, and forming an output or digit winding linking certain of the cores, as determined by the code. There will be other wires (not shown) similar to 20 corresponding to the remaining digits and linking other combinations of the cores. The windings have not been shown in FIG. 6.

The signal and bias currents supplied to windings 17 and 18 should be in such direction as to produce like magnetic poles on the opposiing faces of the pole-pieces 14 and 15. Then if windings 17 and 18 have the same number of turns, and if the signal current is, for example, greater than the bias current, then there will be a region nearer to pole-piece 15 than to the pole-piece 14 where the magnetic fields due to the pole-pieces substantially neutralize one another, and a core 16 located in this region will not be affected. All the other cores will however be subjected to a residual magnetic field, and it can be arranged so that all such other cores are saturated thereby and cannot be switched by a pulse from the source 6. As the signal current increases or decreases, so the region of neutralization moves nearer to, or further from, pole-piece 15, and it will be seen that the core which is capable of being switched is thereby selected according to the signal level. The assembly can be so proportioned that when the signal current is a maximum, the core nearest the pole-piece 15 is capable of being switched, and when it is a minimum the core nearest to pole-piece 14 is the one which can be switched.

It will be understood that the cores 16 are not necessarily equally spaced between the pole-pieces 14 and 15. The spacing may, for example, be arranged so as to make the quantizing steps unequal. In particular, the spacing could be arranged to introduce amplitude compression.

It is desirable that the air spaces between the cores 16 and the walls and the lid of the trough should be reduced to a minimum, and should preferably be filled up in some suitable way by the material of low retentivity; in other words it is preferable that the cores 16 should be effectively embedded in the material of low retentivity. It is of course necessary to provide suitable holes or channels (not shown) in the trough to enable the various wires to be brought outside the device.

While in FIGS. 5 and 6 the cores 16 are arranged so that the axes of the central holes are on a line normal to the faces of the pole pieces 14 and 15, they could alternatively be arranged with the axes of the holes perpendicular to this line, but this arrangement is probably less convenient for threading the windings. It will be noted that in either arrangement rapid changes in the signal current do not tend to switch any of the cores in the absence of trigger pulses.

It will be noted that since the magnetic field produced by the bias source 11 is constant, it could alternatively be produced by a permanent magnet which could, for example, replace the pole-piece 15, the winding 18 and source 11 being then omitted.

While the principles of the invention have been described above in connection with specific embodiments, and particular modifications thereof, it is to be clearly understood that this description is made only by way of example and not as a limitation on the scope of the invention.

What I claim is:

1. A magnetic trigger device comprising: a first magnetic circuit having two opposed pole-pieces, and being composed of a magnetic material of low retentivity and low hysteresis loss; a plurality of closed magnetic circuits serially arranged in a line between said pole-pieces, said closed magnetic circuits being of saturable magnetic material of higher retentivity than the first-mentioned magnetic material; a magnetizing winding linking said first magnetic circuit but not linking any of the closed magnetic circuits; and a winding linking all of said closed magnetic circuits without effectively linking said first magnetic circuit.

2. A magnetic trigger arrangement comprising: a magnetic circuit composed of two portions of respectively different magnetic materials, the first portion being of low retentivity and low hysteresis loss, and the second portion being saturable and of higher retentivity than the first portion, and having a hole therethrough; a control winding linking said first portion of said magnetic circuit; a trigger winding and an output winding passing through said hole without effectively linking said first portion of said magnetic circuit; a source of a control current connected to said control winding for controlling the saturation of said second portion; a source of trigger waves connected to said trigger winding, and a load circuit connected to said output winding.

3. A magnetic trigger arrangement according to claim 2 further comprising: means for biasing said magnetic circuit in a direction opposite the direction of the magnetic flux resulting from said source of control current.

4. An arrangement according to claim 2 wherein the length of the magnetic circuit of said first portion is greater than the magnetic length of said second portion.

5. A magnetic trigger device comprising:

a first closed magnetic circuit having two opposed pole-pieces and composed of a magnetic material of low retentivity and low hysteresis loss;

a plurality of additional closed magnetic circuits serially arranged in a line between said pole-pieces, said additional magnetic circuits being of saturable magnetic material of higher retentivity than the first-mentioned magnetic material;

two magnetizing windings linking said first magnetic circuit but not linking any of said additional magnetic circuits, one of said magnetizing windings being wound over one pole-piece, the second magnetizing winding being wound over the second pole-piece;

a third winding linking all of said additional magnetic circuits without effectively linking said first magnetc circuit; and at least one additional winding linking a predetermined number of said additional magnetic circuits also without effectively linking said first magnetic circuit.

6. A magnetic trigger device according to claim 5 further comprising:

a source of signal waves connected to one of said two magnetizing windings;

a biasing source connected to the other of said two magnetizing windings;

a source of trigger waves connected to said third winding; and a load circuit connected to said additional winding; and in which said two magnetizing windings generate opposing fluxes in said pole-pieces whereby only one of said additional closed magnetic circuits is unsaturated depending on the magnitude of said signal wave at the time a pulse is generated by said source of trigger waves.

7. A magnetic trigger device according to claim 5 further comprising means for encapsulating the space between said first closed magnetic circuit and said plurality of additional closed magnetic circuits with a magnetic material of low retentivity and low hysteresis loss.

8. A magnetic trigger device according to claim 5 in which all of said additional closed magnetic circuits are toroidal cores.

References Cited in the file of this patent

UNITED STATES PATENTS

| | | |
|---|---|---|
| 2,696,347 | Lo | Dec. 7, 1954 |
| 2,740,110 | Trimble | Mar. 27, 1956 |
| 2,781,503 | Saunders | Feb. 12, 1957 |
| 2,913,596 | Ogle | Nov. 17, 1959 |
| 2,969,523 | Kelley | Jan. 24, 1961 |

FOREIGN PATENTS

| | | |
|---|---|---|
| 1,158,080 | France | Jan. 13, 1958 |
| 1,198,497 | France | June 15, 1959 |